US012677046B2

(12) United States Patent (10) Patent No.: US 12,677,046 B2
Ajgaonkar (45) Date of Patent: Jul. 7, 2026

(54) DYNAMICALLY PREPROCESSING OF STREAMING VIDEO DATA AND REVIEW OF THE VIDEO DATA BY A LARGE LANGUAGE MODEL

(71) Applicant: Insight Direct USA, Inc., Chandler, AZ (US)

(72) Inventor: Amol Ajgaonkar, Chandler, AZ (US)

(73) Assignee: Insight Direct USA, Inc., Chandler, AZ (US)

( * ) Notice: Subject to any disclaimer, the term of this patent is extended or adjusted under 35 U.S.C. 154(b) by 0 days.

(21) Appl. No.: 18/883,732

(22) Filed: Sep. 12, 2024

(65) Prior Publication Data

US 2025/0260881 A1 Aug. 14, 2025

Related U.S. Application Data

(60) Provisional application No. 63/553,204, filed on Feb. 14, 2024.

(51) Int. Cl.
| | |
|---|---|
| *H04N 21/84* | (2011.01) |
| *G06V 10/25* | (2022.01) |
| *G06V 10/74* | (2022.01) |
| *G11B 27/031* | (2006.01) |

(52) U.S. Cl.
CPC ............. *H04N 21/84* (2013.01); *G06V 10/25* (2022.01); *G06V 10/761* (2022.01); *G11B 27/031* (2013.01)

(58) Field of Classification Search
CPC .... H04N 21/84; H04N 21/8549; G06V 10/25; G06V 10/761; G06V 20/46; G11B 27/031
See application file for complete search history.

(56) References Cited

U.S. PATENT DOCUMENTS

| | | | |
|---|---|---|---|
| 9,635,307 B1* | 4/2017 | Mysore Vijaya Kumar ................ | G06T 7/90 |
| 11,910,073 B1* | 2/2024 | Sharma .............. | H04N 21/8549 |
| 11,954,151 B1* | 4/2024 | Jain ........................ | G06F 16/783 |
| 11,995,412 B1* | 5/2024 | Mishra .................. | G06F 16/735 |
| 12,056,918 B1* | 8/2024 | Goyal .................... | H04N 7/183 |
| 12,283,291 B1* | 4/2025 | Sarfati .............. | H04N 21/8106 |
| 12,301,960 B1* | 5/2025 | Ben-Cohen ........ | H04N 21/8456 |
| 2011/0063500 A1* | 3/2011 | Loher ................ | H04N 21/4728 |
| | | | 348/E7.003 |
| 2020/0320116 A1* | 10/2020 | Wu ......................... | H04L 51/10 |
| 2021/0326393 A1* | 10/2021 | Aggarwal ................ | G06N 3/09 |
| 2022/0076707 A1* | 3/2022 | Walker ................... | G06V 20/41 |
| 2022/0108208 A1* | 4/2022 | Li ............................ | G06N 5/04 |
| 2023/0019360 A1* | 1/2023 | Whatmough .......... | G06V 10/22 |
| 2023/0154188 A1* | 5/2023 | Li ........................ | G06V 10/776 |
| | | | 382/159 |

(Continued)

*Primary Examiner* — Fernando Alcon
(74) *Attorney, Agent, or Firm* — Kinney & Lange, P.A.

(57) ABSTRACT

A method of preprocessing incoming video data of at least one region of interest can include receiving the incoming video and preprocessing the incoming video data, by a computer processor, according to preprocessing parameters, wherein the preprocessing includes formatting the incoming video data to create first video data of a first region of interest. The method can further include providing the first video data to a transformer model along with a prompt requesting the transformer to describe the first video data, and describing, by the transformer model, the first video data to create at least one description of the first video data.

20 Claims, 6 Drawing Sheets

(56)          References Cited

U.S. PATENT DOCUMENTS

| | | | |
|---|---|---|---|
| 2024/0114146 A1 | 4/2024 | Kawai et al. | |
| 2024/0177443 A1 | 5/2024 | Ajgaonkar | |
| 2024/0205520 A1* | 6/2024 | Carbajo | G10L 15/26 |
| 2024/0232937 A1* | 7/2024 | D'Auria | G06N 3/0475 |
| 2024/0395042 A1* | 11/2024 | Boiarov | G06V 10/774 |
| 2024/0406521 A1* | 12/2024 | Ramesh | H04N 21/8549 |
| 2025/0124689 A1* | 4/2025 | Williams | G06V 10/764 |
| 2025/0182483 A1* | 6/2025 | Zhao | G06V 20/41 |
| 2025/0190503 A1* | 6/2025 | Lee | G06F 16/9535 |
| 2025/0238968 A1* | 7/2025 | Ibrahim | G06T 11/00 |
| 2025/0292802 A1* | 9/2025 | Ramesh | G10L 13/02 |
| 2025/0384251 A1* | 12/2025 | Chefer-Livshen | G06N 3/0475 |

\* cited by examiner

Figure 2:
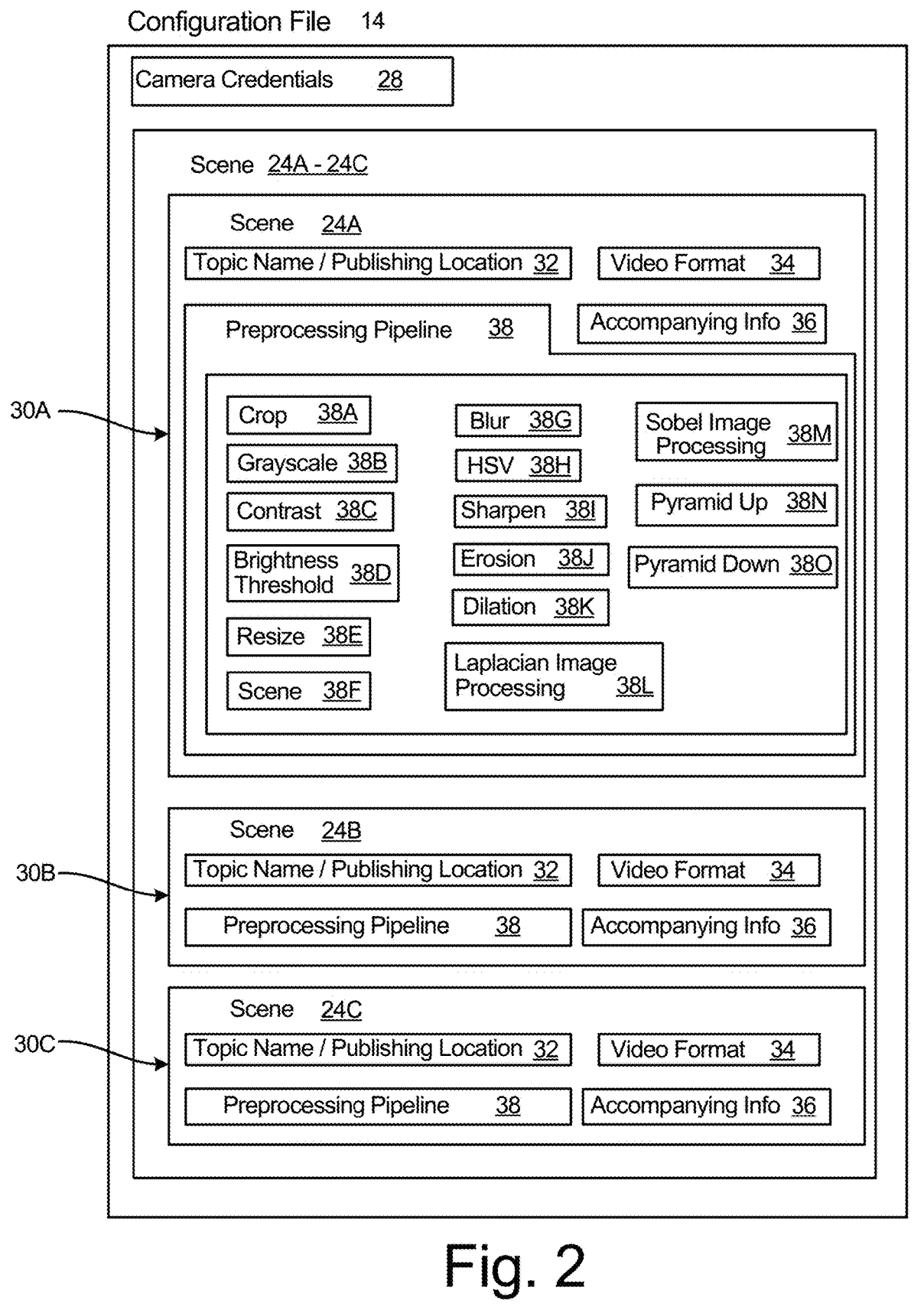

Configuration File    14

Camera Credentials          28

Scene   24A - 24C

Scene    24A

Topic Name / Publishing Location 32        Video Format    34

Preprocessing Pipeline        38        Accompanying Info 36

30A →

| Crop 38A | Blur 38G | Sobel Image Processing 38M |
| Grayscale 38B | HSV 38H | |
| Contrast 38C | Sharpen 38I | Pyramid Up 38N |
| Brightness Threshold 38D | Erosion 38J | Pyramid Down 38O |
| Resize 38E | Dilation 38K | |
| Scene 38F | Laplacian Image Processing 38L | |

Scene    24B

Topic Name / Publishing Location 32        Video Format    34

Preprocessing Pipeline        38        Accompanying Info 36

30B →

Scene    24C

Topic Name / Publishing Location 32        Video Format    34

Preprocessing Pipeline        38        Accompanying Info 36

DYNAMICALLY PREPROCESSING OF STREAMING VIDEO DATA AND REVIEW OF THE VIDEO DATA BY A LARGE LANGUAGE MODEL

CROSS-REFERENCE TO RELATED APPLICATION

This application is a nonprovisional application claiming the benefit of U.S. provisional Ser. No. 63/553,204, filed on Feb. 14, 2024, entitled "DYNAMICALLY PREPROCESS-ING OF STREAMING VIDEO DATA AND REVIEW OF THE VIDEO DATA BY A LARGE LANGUAGE MODEL" by Amol Ajgaonkar.

TECHNICAL FIELD

The disclosure relates generally to processing of video data and, more specifically, to the selection/extraction, pre-processing/processing, and publishing of video data of a region of interest and subsequent review/analysis by a large language model.

BACKGROUND

Cameras are beneficial for use in all areas of commercial and personal practice. For example, security cameras are used within (and outside) commercial warehouses and on private personal property. Other applications use cameras along assembly lines for quality control purposes. With the increased capabilities of cameras having higher quality imagery (i.e., resolution) and a wider field of view, more area can be shown in the streaming video by the camera. A large portion of the frame/field of view may be of no interest to the consumer (e.g., a security or manufacturing com-pany). However, current practices relay the entirety of the streaming video (i.e., the entire frame/field of view) to the consumer, which can be time and resource consuming due to the need to transfer large frame (i.e., field of view), high resolution video data.

SUMMARY

A system and method for selection/extraction, preprocess-ing, and publishing of video data of a region of interest (i.e., a scene) that is a subset of a field of view of streaming video is disclosed herein. The system and method can also include processing the video data by a consumer/subscriber after the video data has been published. Additionally and/or alterna-tively, the system and method can include processing, reviewing, etc. the video data by a large language model (hereinafter referred to as an "LLM").

Streaming video data is received from a camera with a first field of view. The video data is then preprocessed, by a computer processor such as a gateway or digital/virtual container, according to preprocessing parameters defined within a runtime configuration file that is pushed down to the computer processor. The runtime configuration file can be stored and/or edited distant from the computer processor, and any edits/revisions to the runtime configuration file can be pushed to and applied by the computer processor to the streaming video data in real time to alter the preprocessing applied to the video data. The preprocessing can include formatting/cropping the streaming video data received from the camera to create first video data of a first region of interest (i.e., a scene) having a second field of view that is less than (shows less area than) the first field of view shown by the entirety of the streaming video data from the camera. The preprocessing as defined by the preprocessing param-eters in the runtime configuration file can also include altering the video data's grayscale, contrast, brightness, color threshold, size, blur, hue saturation value (HSV), sharpen, erosion, dilation, Laplacian image processing, Sobel image processing, pyramid up, and pyramid down (among others). The video data/frame can then be published to an endpoint (such as a topic on an asynchronous mes-saging library like ZeroMQ) for subscription and use by a first subscriber/consumer.

The first video data can then be viewed, used, and/or processed by the first subscriber, which can be a large language model. The preprocessing as defined in the runtime configuration file can be tailored to the subscriber and the needs/uses of the subscriber and the processing to be per-formed by the subscriber. For example, the processing performed by the subscriber after publishing of the first video data/frame may be using an artificial intelligence (AI) model to analyze scenarios occurring on/in the first video data/frame. The AI model may require the first video data/frame to be in a particular size, format, etc., which can be selected and applied during the preprocessing as set out in the runtime configuration file so that the subscriber does not need to perform this preprocessing before applying the AI model. The processing, by a computer processor, of the first video data by the subscriber can be performed distant from the camera, the location at which the runtime configuration file is stored and/or edited, and the gateway/container upon which the preprocessing is performed. The first subscriber can perform the processing of the video data to determine at least one output with the output being indicative of an inference dependent on the first video data. For example, the first video data can be processed by an AI model to deter-mine the amount of a particular product that has passed by on an assembly line (i.e., the amount of the product being an inference dependent on the first video data). The processing can include other operations, such as applying optical char-acter recognition, clipping the first video data to make a video having a specific duration, and/or capturing one frame from the first video data to create a static image of a specific moment of the first video data.

BRIEF DESCRIPTION OF THE DRAWINGS

FIG. 2 is a schematic of an example runtime configuration file.

Figure 1:
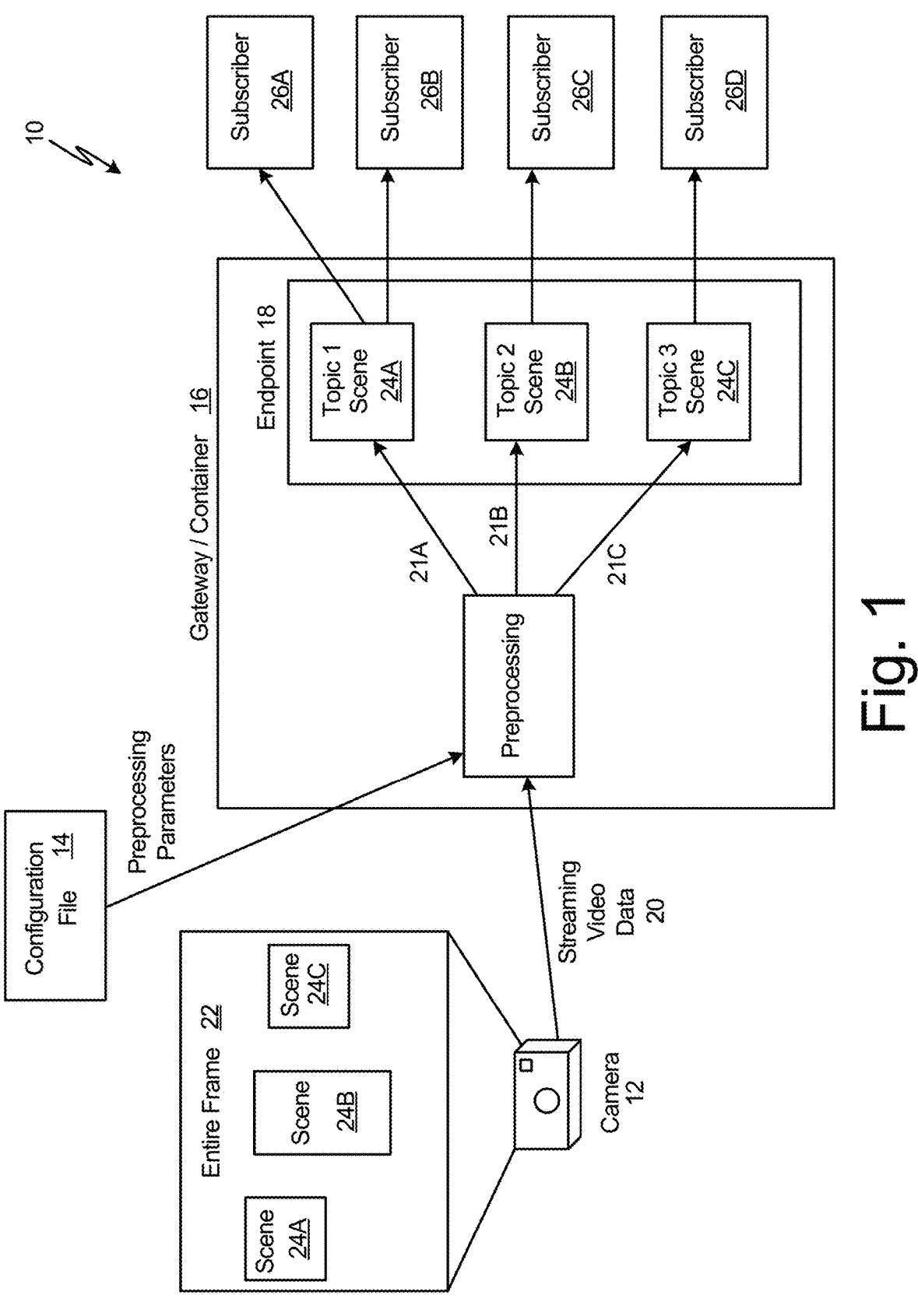
FIG. 1 is a schematic of an example scene selection and preprocessing system.

While the above-identified figures set forth one or more embodiments of the present disclosure, other embodiments are also contemplated, as noted in the discussion. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and embodiments of the present invention may include features and components not specifically shown in the drawings.

DETAILED DESCRIPTION

FIG. 1 is a schematic of system 10 for selection/extraction, preprocessing, and publishing to subscribers of video data of a region of interest (i.e., a scene) that is a subset of a first field of view of the streaming video. System 10 can include camera 12, configuration file 14, gateway/container 16, and publishing location/endpoint 18. Camera 12 can include streaming video data 20 having entire frame 22 with a first field of view. Scenes 24A, 24B, and 24C (i.e., individual regions of interest) can be selected/extracted from entire frame 22 each having a second field of view, a third field of view, and a fourth field of view, respectively, that are less than the first field of view of entire frame 22. Camera 12 collects streaming video data 20 and transfers/sends streaming video data 20 to gateway/container 16. Gateway/container 16 preprocesses streaming video data 20 according to preprocessing parameters defined in configuration file 14 and publishes (i.e., allows access/makes available) the preprocessed video data as first video data 21A (for scene 24A), second video data 21B (for scene 24B), and third video data 21C (for scene 24C) to publishing location/endpoint 18. Subscribers 26A-26D can subscribe to video data 21A-21A of each scene 24A-24C located at endpoint 18 to access each scene 24A-24C.

Scene 24A (i.e., a first region of interest) includes first video data 21A, scene 24B (i.e., a second region of interest) includes second video data 21B, and scene 24C (i.e., a third region of interest) includes third video data 21C that are each dependent upon streaming video data 20. In one example, first video data 21A forming scene 24A (i.e., a first region of interest) has a second field of view that is less than the first field of view comprising entire frame 22 shown by camera 12 (as streaming video data 20).

System 10 can include machine-readable storage media. In some examples, a machine-readable storage medium can include a non-transitory medium. The term "non-transitory" can indicate that the storage medium is not embodied in a carrier wave or a propagated signal. In certain examples, a non-transitory storage medium can store data that can, over time, change (e.g., in RAM or cache). In some examples, storage media can be entirely or in part a temporary memory, meaning that a primary purpose storage media is not long-term storage. Storage media, in some examples, is described as volatile memory, meaning that the memory, does not maintain stored contents when power to system 10 (or the component(s) where storage media are located) is turned off. Examples of volatile memories can include random access memories (RAM), dynamic random-access memories (DRAM), static random-access memories (SRAM), and other forms of volatile memories. In some examples, storage media can also include one or more machine-readable storage media. Storage media can be configured to store larger amounts of information than volatile memory. Storage media can further be configured for long-term storage of information. In some examples, storage media include non-volatile storage elements. Examples of such non-volatile storage elements can include magnetic hard discs, optical discs, flash memories and other forms of solid-state memory, or forms of electrically programmable memories (EPROM) or electrically erasable and programmable (EEPROM)

memories. Most generally, storage media is machine-readable data storage capable of housing stored data from a stored data archive.

System 10 can also include one or multiple computer/data processors. In general, the computer/data processors can include any or more than one of a processor, a microprocessor, a controller, a digital signal processor (DSP), an application specific integrated circuit (ASIC), a field-programmable gate array (FPGA), or other equivalent discrete or integrated logic circuitry. System 10 can include other components not expressly disclosed herein but that are suitable for performing the functions of system 10 and associated methods of preprocessing and processing video data and other forms of data. For example, system 10 can include communication means for pushing/sending configuration file 14 from storage media at a location distant from gateway/container 16, such as cloud storage, to gateway/container 16 for execution/implementation on streaming video data 20.

Camera 12 can be any device capable of collecting streaming video data 20, such as a Real Time Streaming Protocol (RTSP) camera or a USB camera. Streaming video data 20 can be video data that is continuously captured/recorded by camera 12 in any suitable format. Camera 12 can be positioned/located to provide streaming video data 20 displaying entire frame 22 with a first field of view The first field of view shown/displayed by camera 12 can be a wide field of view that shows multiple regions of interest. Video data 20 being collected, for example, can show a wide field of view of a warehouse for storing commercial products and/or an assembly line producing commercial products of which each individual subscriber 26A-26D may only be interested in a region/scene 24A-24C that is a subset of entire frame 22. Camera 12 can collect and transfer streaming video data 20 in any resolution/video quality and any format, including (but not limited to) MP4, AVI, FLV, WMV, MOV, MPEG, Motion JPEG, AVCHD, WebM, and/or MKV. Camera 12 can transfer/send streaming video data 20 to gateway/container 16 over any suitable means, including via the internet, short-range wireless technology, or any other type of wired and/or wireless connection.

Configuration file 14 is an editable file that contains preprocessing parameters that define, among other instructions, how streaming video data 20 is to be preprocessed by gateway/container 16 to create video data 21A-21C. Configuration file 14 can include numerous other instructions for gateway/container 16, including which camera 12 to connected to (i.e., receive streaming video data 20 from), what portion of entire frame 22 to select/extract to create scenes 24A-24C (i.e., how to crop frame 22 to create scenes 24A-24C), and at which endpoint 18 to publish the preprocessed scenes 24A-24C. This is discussed in detail with regards to FIG. 2. Configuration file 14 can be edited/revised and pushed/conveyed to gateway/container 16 for execution in real time (i.e., runtime) such that an editor can revise the preprocessing parameters and those revisions can be applied to scenes 24A-24C at runtime. Configuration file 14 can be an executable program file or have another format for including instructions and conveying information that is then used by gateway/container 16 to apply the preprocessing to video streaming data 20. Additionally, configuration file 14 can be stored in storage media adjacent to and/or part of gateway/container 16 or in storage media distant from gateway/container 16, such as in the cloud. Configuration file 14 can be accessible only by one editor or can be accessible by multiple parties, which may include subscribers 26A-26D who can edit the preprocessing parameters defined by/within configuration file 14 to instruct gateway/container 16 to preprocess one or each of scenes 24A-24C depending on the needs/desires of subscribers 26A-26D, respectively.

Gateway/container 16 can include a computer processor capable of performing instructions provided by configuration file 14, which can include preprocessing parameters that are to be applied to streaming video data 20. Gateway/container 16 can be a gateway node, edge device, container, virtual machine, or other software and/or hardware able to accept configuration file 14 and perform the instructions therein to apply the preprocessing parameters to streaming video data 20. Further, gateway/container 16 can be within a single computer hardware set up due to virtualization. Gateway/container 16 can include one or multiple storage media for storing information, such as the preprocessing parameters pushed/sent to gateway/container 16 by/from configuration file 14 and/or other information like streaming video data 20. Gateway/container 16 can be located at various locations, including adjacent to camera 12 and/or on the same network as camera 12, distant from camera 12 with streaming video data 20 being received by gateway/container 16 from camera 12 via a wired or wireless connection, in the cloud, or at multiple locations. Gateway/container 16 is in communication with configuration file 14 to accept instructions for applying preprocessing parameters. Additionally, gateway/container 16 may be configured to contact configuration file 14 to determine if configuration file 14 has been edited. If edited, gateway/container 16 can perform preprocessing (on streaming video data 20 being received) according to the newly edited configuration file 14.

For clarity, streaming video data 20 is unaltered video data that is received by gateway/container 16 from camera 12, whereas first video data 21A is video data that has been preprocessed by gateway/container 16 (according to preprocessing parameters defined in configuration file 14) to create scene 24A. Similarly, second video data 21B is video data that has been preprocessed to create scene 24B, and third video data 21C is video data that has been preprocessed to create scene 24C. For each of first, second, and third video data 21A-21C, the originating video data is streaming video data 20 (which can be converted to raw video data 20A as described with regards to FIG. 3 below). Each of scenes 24A-24C can be a subset of entire frame 22 and show second, third, and fourth fields of view, respectively, that are less than the first field of view of entire frame 22. However, other scenes can have the same field of view as first field of view of entire frame 22 and instead other editing is performed on that scene besides cropping; for example, that scene can be edited to be in grayscale whereas entire frame 22 of streaming video data 20 is in color.

Gateway/container 16 can be in communication with endpoint 18 to which gateway/container 16 publishes the preprocessed video data 21A-21C (e.g., scenes 24A-24C). The communication can be wired or wireless, such as communication via the internet. However, endpoint 18 can be at the same location as gateway/container 16 or on the same computer hardware set up and/or network. For example, gateway/container 16 can host endpoint 18 on which gateway/container 16 publishes the preprocessed video data/frame 21A-21C (e.g. scenes 24A-24C). Endpoint 18 can be hosted by the container to which all the subscribers 26A-26D can connect. Further, endpoint 18 can be located on the internet with a unique address and/or security protocol that allows for subscription and access to scenes 24A, 24B, and 24C. Scenes 24A, 24B, and 24C can be published to endpoint 18 using an asynchronous messaging library, for example ZeroMQ, such that scenes 24A, 24B, and 24C are published as topic 1, topic 2, and topic 3, respectively. Subscribers 26A-26D can subscribe to any of topics 1-3 to receive video data 21A-21C of scenes 24A, 24B, 24C, respectively. Gateway/container 16 can publish video data 21A-21C of each of scenes 24A-24C to endpoint 18 in any format suitable for use by subscribers 26A-26D. For example, video data 21A-21C can each be published as Motion JPEG or any of the formats listed above with regards to streaming video data 20. The format that video data 21A-21C of each of scenes 24A-24C can be designated in configuration file 14 and applied to video data 21A-21C by gateway/container 16.

Each scene 24A-24C at topics 1-3, respectively, can be subscribed to by any number of subscribers 26A-26D. In the example shown in FIG. 1, scene 24A has two subscribers 26A and 26B while scene 24B has one subscriber 26C and scene 24C has one subscriber 26D. Video data 21A-21C of each of scenes 24A-24C can be further processed by subscriber 26A-26D, respectively, depending on the desired output/inference to be determined from video data 21A-21C. For example, first video data 21A of scene 24A can be further processed by an AI model to determine the amount of a particular product that has passed by camera 12 (in the second field of view of scene 24A) on an assembly line. This is described in detail with regards to FIG. 5.

FIG. 2 is a schematic of configuration file 14. Each "component" of configuration file 14 can be one or a set of instructions that, when executed by gateway/container 16, applies a process/edit. Thus, while this disclosure may discuss the components of configuration file 14 as being physical, tangible elements, the components can be one or multiple groups of executable software code contained within configuration file 14. Configuration file 14 includes information regarding camera credentials 28 and preprocessing parameters 30A-30C corresponding to scenes 24A-24C. Preprocessing parameters 30B and 30C can include the same type of information/parameters as preprocessing parameters 30A. However, for simplicity, the possibilities of information/parameters shown in FIG. 2 with regards to preprocessing parameters 30A are not shown for preprocessing parameters 30B and 30C. However, preprocessing parameters 30B and 30C can be the same or different from each other and from preprocessing parameters 30A corresponding to scene 24A. Preprocessing parameters 30A can include topic name/publishing location 32, video format 34, accompanying information 36, and preprocessing pipeline 38 having various video edits 38A-38O. Video edits 38A-38O can include the nonexclusive list of crop 38A, grayscale 38B, contrast 38C, brightness 38D, threshold 38E, resize 38F, blur 38G, hue saturation value (HSV) 38H, sharpen 38I, erosion 38J, dilation 38K, Laplacian image processing 38L, Sobel image processing 38M, pyramid up 38N, and pyramid down 38O.

Configuration file 14 can be edited and pushed/conveyed to gateway/container 16 in real time (i.e., runtime) such that preprocessing parameters 30A-30C (and the other information contained in configuration file 14) can be applied to streaming video data 20 immediately to preprocess and output video data 21A-21C. Configuration file 14 can be stored, edited, and/or pushed/conveyed to gateway/container 16 in any suitable format/file type. Configuration file 14 can include other information/parameters not expressly disclosed herein and not shown in FIG. 2.

Configuration file 14 can include camera credentials 28, which provides the information needed for gateway/container 16 to connect to camera 12 and/or receive streaming video data 20 from camera 12. Camera credentials 28 can include other information such as encryption/decryption information, security access information, and/or instructions for beginning and/or ending the collection of streaming video data 20 by camera 12. Camera credentials 28 can include information for connecting to multiple cameras 12 and/or information for gateway/container 16 to receive the same or different streaming video data 20 from the same or different cameras 12 for different scenes 24A-24C. In one example, camera credentials 28 are provided once and applied to all scenes 24A-24C. In another example, different camera credentials 28 are provided for each scene 24A-24C and applied to each of scenes 24A-24C individually. Additionally, system 10 can be situated/configured with multiple cameras that provide multiple streaming video data 20 that can be utilized to create different scenes 24A-24C. For example, scene 24A can be video data 21A derived from streaming video data 20 from a first camera, while scenes 24B and 24C can be video data 21B and 21C, respectively, derived from different streaming video data 20 from a second camera. To accomplish this, configuration file 14 would contain camera credentials 28 for each scene 24A-24C (or one camera credential 28 for scene 24A and another, different camera credential 28 for scenes 24B and 24C).

Configuration file 14 also include information specific to each scene 24A-24C. This information/instructions are designated as preprocessing parameters 30A, 30B, and 30C, respectively. Preprocessing parameters 30A-30C are used by gateway/container 16 (e.g., in the form of executable instructions) and applied to streaming video data 20 to create video data 21A-21C of scenes 24A-24C, respectively. Preprocessing parameters 30A-30C can include topic name/publishing location 32, which designates where video data 21A-21C of scenes 24A-24C will be published after preprocessing. As described below with regards to gateway/container 16 and FIG. 3, publishing location 32 can be a proxy location which is then relayed to unified endpoint 18 to make locating the topic/scenes 24A-24C easier for subscribers 26A-26D. Publishing location 32 can be any other location suitable for providing access to subscribers 26A-26D.

Configuration file 14 can designate video format 34 that each of scenes 24A-24C is to be published at, which can be the same format as streaming video data 20 or any other type of suitable video format, including the formats listed above with regards to streaming video data 20 and/or video data 21A-21C. Scenes 24A-24C can be published having the same video format 34 or different video formats 34. If the format of the video data of scenes 24A-24C is to be changed, the steps of changing the video format can be performed before, during, or after any of the other instructions/steps set out in preprocessing parameters 30A-30C. For example, video format 34 can be changed before, during, or after video edits 38A-38O are performed by gateway/container 16.

Preprocessing parameters 30A-30C can also include accompanying information 36, which is information provided/published with video data 21A-21C for each of scenes 24A-24C. Accompanying information 36 can include any information about first video data 21 that may be of use to subscribers 26A-26C. For example, accompanying information 36 can include first video data 21A frame size, which may be helpful in indicating to subscriber 26A what processing should be performed on first video data 21A of scene 24A; if the frame size is 720 pixels by 486 pixels, first video data 21A of scene 24A may be most suitable for processing by an AI model. Accompanying information 36 can include metadata and/or other information regarding what preprocessing has been performed on streaming video data 20 to create video data 21A-21C for scenes 24A-24C, respectively.

Preprocessing parameters 30A-30C can also include preprocessing pipeline 38 that includes numerous video edits 38A-38O that can be applied to streaming video data 20 to create video data 21A-21C for each of scenes 24A-24C. Preprocessing pipeline 38 can designate the instructions for the entire video edits made to streaming video data 20 for each of scenes 24A-24C. The amount of time gateway/container 16 takes to perform the video edits designated by preprocessing pipeline 38 (i.e., video edits 38A-38O) for each of scenes 24A-24C can be measured, recorded, and displayed as preprocessing performance metrics (see FIG. 4). The order in which video edits 38A-38O are performed can be optimized by gateway/container 16 and/or optimized within configuration file 14 to reduce the amount of time gateway/container 16 takes to perform preprocessing pipeline 38. This optimization can be done manually by an editor (e.g., the individual with access to edit configuration file 14) or automatically by system 10. For example, depending on which video edits 38A-38O are to be performed in preprocessing pipeline 38 by gateway/container 16, the order of performance of those video edits 38A-38O can be rearranged to reduce the amount of time gateway/container 16 takes to perform preprocessing pipeline 38. In one example, crop 38A is the first video edit 38A-38O to be performed, followed by other video edits 38B-38O.

Video edits 38A-38O are a nonexclusive list of edits that can be designated in configuration file 14 and performed on streaming video data 20 by gateway/container 16. Preprocessing pipeline 38 can include other video edits not expressly included in the list of video edits 38A-38O. Similarly, not all of video edits 38A-38O need to be performed to create video data 21A-21C of each of scenes 24A-24C, and different scenes 24A-24C can include different video edits 38A-38O performed on streaming video data 20 by gateway/container 16. In one example, only crop 38A is performed on streaming video data 20 to create first video data 21A of scene 24A, while a different crop 38A and brightness 38D, resize 38E, and dilation 38K are performed on streaming video data 20 to create second video data 21B of scene 24B that is different than first video data 21A of scene 24A.

Each of video edits 38A-38O are briefly described as follows. Crop 38A is the removal of unnecessary areas/regions (i.e., regions that are not of-interest to the subscriber) of entire frame 22 having first field of view to create scenes 24A-24C each with second, third, and fourth field of views, respectively. Scenes 24A-24C that have been cropped 38A have fields of view that are a subset of (i.e., less than) first field of view of entire frame 22. Grayscale 38B is the alteration of the color of video data 21A-21C and can include limiting the color to be between white and black. Contrast 38C is the alteration of the difference between the maximum and minimum pixel intensity. Brightness 38D is the alteration in the luminous brightness of video data 21A-21C. Threshold 38E is the alteration of the color of video data 21A-21C by changing the color of select pixels of video data 21A-21C that are above a specified threshold color value. Resize 38F is the alteration of the frame size of video data 21A-21C without cutting/cropping any of the frame out. Blur 38G is the alteration of the clarity of video data 21A-21C, which may be desired for some processing applications, such as an IA model, performed by subscribers 26A-26D. Hue saturation value (HSV) 38H is assigning a numerical readout of video data 21A-21C that corresponds to the color contained therein. Sharpen 38I is altering video data 21A-21C to make the objects therein appear more defined/sharpened. Erosion 38J is altering video data 21A-21C by shrinking pixels and/or removing pixels on object boundaries, while dilution 38K is the reverse of erosion in that video data 21A-21C is enlarged by resizing pixels and/or adding pixels at object boundaries. Laplacian image processing 38L and Sobel image processing 38M are processing techniques known in the art that can be applied to video data 21A-21C. Pyramid up 38N and pyramid down 38O are altering video data 21A-21C by smoothing and/or subsampling as known in the art. Each of scenes 24A-24C can include these and other video edits 38A-38O to be applied by gateway/container 16 to preprocess streaming video data 20 and output as scenes 24A-24C for use by subscribers 26A-26D.

Configuration file 14 can arrange the instructions of camera credentials 28 and preprocessing parameters 30A-30C to be performed in any order, or gateway/container 16 can have the capabilities to arrange/rearrange the information/instructions to be performed in a desired/optimized sequence. Additionally, gateway/container 16 can be configured to perform each set of preprocessing parameters 30A-30C in parallel such that preprocessing parameters 30A, preprocessing parameters 30B, and preprocessing parameters 30C are performed at the same time (and the time gateway/container 16 takes to perform those preprocessing parameters are measured, recorded, and displayed as metrics). While preprocessing parameters 30A-30C can be performed in parallel with one another, preprocessing pipeline 38 (video edits 38A-38O) are performed in series (i.e., in sequence) with one another, with the order that video edits 38A-38O for each scene 24A-24C able to be arranged to reduce the processing time gateway/container 16 takes to perform those video edits. Configuration file 14 can be edited at any time by an editor and then pushed/conveyed/accessed by gateway/container 16 at runtime such that the preprocessing of video data 21A-21C is altered according to the newly edited configuration file 14 at runtime.

Figure 3:
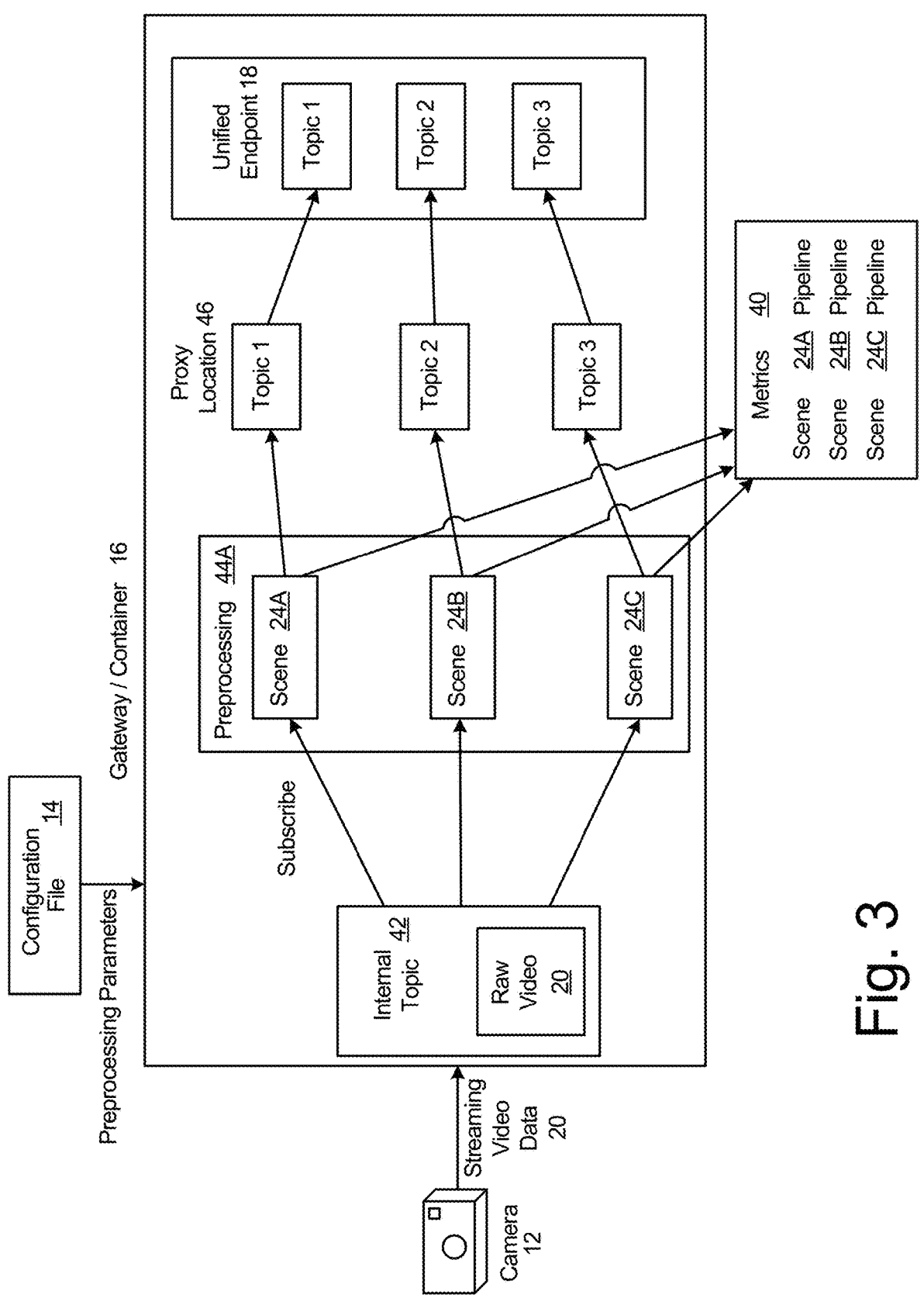
FIG. 3 is a schematic of an example gateway/container along with the inputs and outputs of the gateway/container.

FIG. 3 is a schematic of gateway/container 16 (hereinafter, "gateway 16") along with inputs to and outputs from gateway 16. Each "component" of gateway 16 (and corresponding inputs and outputs) can be one or a set of instructions, programs, processors, storage media locations, and/or other software or hardware used to select/extract, preprocess, and publish video data 21A-21C as scenes 24A-24C. Thus, while this disclosure may discuss the components of gateway 16 (and corresponding inputs and output) as being physical, tangible elements, the components can be partially or entirely contained within software and/or hardware.

Inputs to gateway 16 can be streaming video data 20 (received from camera 12) and configuration file 14, which includes camera credentials 28 and preprocessing parameters 30A-30C. Outputs from gateway 16 can be scenes 24A-24C to unified endpoint 18 (which can be hosted by the gateway 16), which is the location at which scenes 24A-24C are published as topics 1-3, and metrics 40, which is the location at which preprocessing pipeline 38 information (i.e., the amount of time gateway 16 takes to apply preprocessing parameters 30A-30C to streaming video data 20 to create scenes 24A-24C) is published/accessible. Gateway 16 can include raw video data 20A, which is streaming video data 20 that has been published at internal topic 42 and to which gateway 16 subscribes to receive video data used to create each of scenes 24A-24C. Gateway 16 can include preprocessing pipeline optimization and preprocessing 44, which uses preprocessing parameters 30A-30C as defined in configuration file 14 to preprocess streaming video data 20 (accessed as raw video data 20A at internal topic 42) to create scenes 24A-24C. Gateway 16 publishes scenes 24A-24C to proxy location 46 at topics 1-3, respectively. Gateway 16 can then publish/relay scenes 24A-24C (having video data 21A-21C) from proxy location 46 to unified endpoint 18 (which can be hosted by gateway 16).

Gateway 16 receives streaming video data 20 from camera 12 and can publish the video data as raw video data 20A at internal topic 42. This configuration provides for a constant, known location of published raw video data 20A independent of where the original streaming video data 20 is received from. Thus, if the location where streaming video data 20 is being received from changes (e.g., if one camera is disconnected and later the same camera comes online, or a different camera is connected), raw video 20A will still be accessible at internal topic 42 without the need to change where gateway 16 is looking for video data to create scenes 24A-24C, thus ensuring a smooth transition of incoming streaming video data 20. Raw video data 20A published at internal topic 42 can be configured such that only gateway 16 has access.

Gateway 16 can be provided with the information in configuration file 14 (i.e., camera credentials 28 and preprocessing parameters 30A-30C) via a variety of avenues. In one example, gateway 16 has location information of configuration file 14 and actively accesses configuration file 14. In another example, configuration file 14 is pushed/conveyed to gateway 16 once, periodically, or continuously and gateway 16 passively waits to begin preprocessing streaming video data 20 until configuration file 14 has been received. Another example can be a combination of the two above examples in that gateway 16 actively accesses configuration file 14 at the beginning of preprocessing (and continues preprocessing following those known instructions) and configuration file 14 is pushed/conveyed to gateway 16 only after configuration file 14 has been edited/revised.

Gateway 16 can perform pipeline optimization on preprocessing parameters 30A-30C As discussed above, pipeline optimization can be performed by gateway 16 (or another component) to reduce the time gateway 16 takes to preprocess raw video data 20A to create video data 21A-21C (and attach any additional information) of scenes 24A-24C. Pipeline optimization can include arranging/rearranging the order in which video edits 38A-38O are performed by gateway 16.

Gateway 16 can then, according to preprocessing parameters 30A-30C defined within configuration file 14, preprocess 44 raw video data 20A (which is derived from and similar to streaming video data 20) to edit raw video data 20A to create video data 21A-21C of scenes 24A-24C. The preprocessing operations to create each of scenes 24A-24C can be performed individually and sequentially as specified in pipeline 38 for each scene, and multiple scenes 24A-24C are processed in parallel (i.e., simultaneously). The preprocessing performed by gateway 16 can edit each of scenes 24A-24C to the desires/needs of subscribers 26A-26C, respectively. For example, gateway 16 can preprocess raw video data 20A to crop a first field of view of entire frame 22 to eliminate areas/regions of the first field of view that are of no interest to subscriber 26A and keep a second field of view of, for example, scene 24A that is a subset of the first field of view. Thus, further processing by subscriber 26A (or subscriber 26B) does not need to be performed on the areas (regions not of-interest) eliminated/trimmed by the cropping performed during preprocessing. In this example, the cropping reduces the processing time and resources needed by subscriber 26A. The alteration of video format can be included in the preprocessing and/or can be performed before, during, or after the application of other preprocessing parameters 30A-30C.

Scenes 24A-24C, which are made up of raw video data 20A that has been preprocessed according to configuration file 14 to create video data 21A-21C, are published/sent to proxy location 46. Because scenes 24A-24C are continuous video data, scenes 24A-24C are continuously published (e.g., made available) to subscribers 26A-26C, respectively. Scenes 24A-24C can be published/sent first to proxy location 46 and then relayed to unified endpoint 18. Having scenes 24A-24C first being published/sent to proxy location 46 ensures that, no matter what path scenes 24A-24C take, video data 21A-21C of scenes 24A-24C will always end up at proxy location 46 and then be relayed to unified endpoint 18. Because scenes 24A-24C always end up at proxy location 46, unified endpoint 18 always knows the location to access scenes 24A-24C and can actively look to proxy location 46 to obtain scenes 24A-24C or passively wait for scenes 24A-24C to be published/sent to unified endpoint 18. As shown in FIG. 3, proxy location 46 and/or unified endpoint 18 can be located in/hosted by gateway 16.

Figure 4:
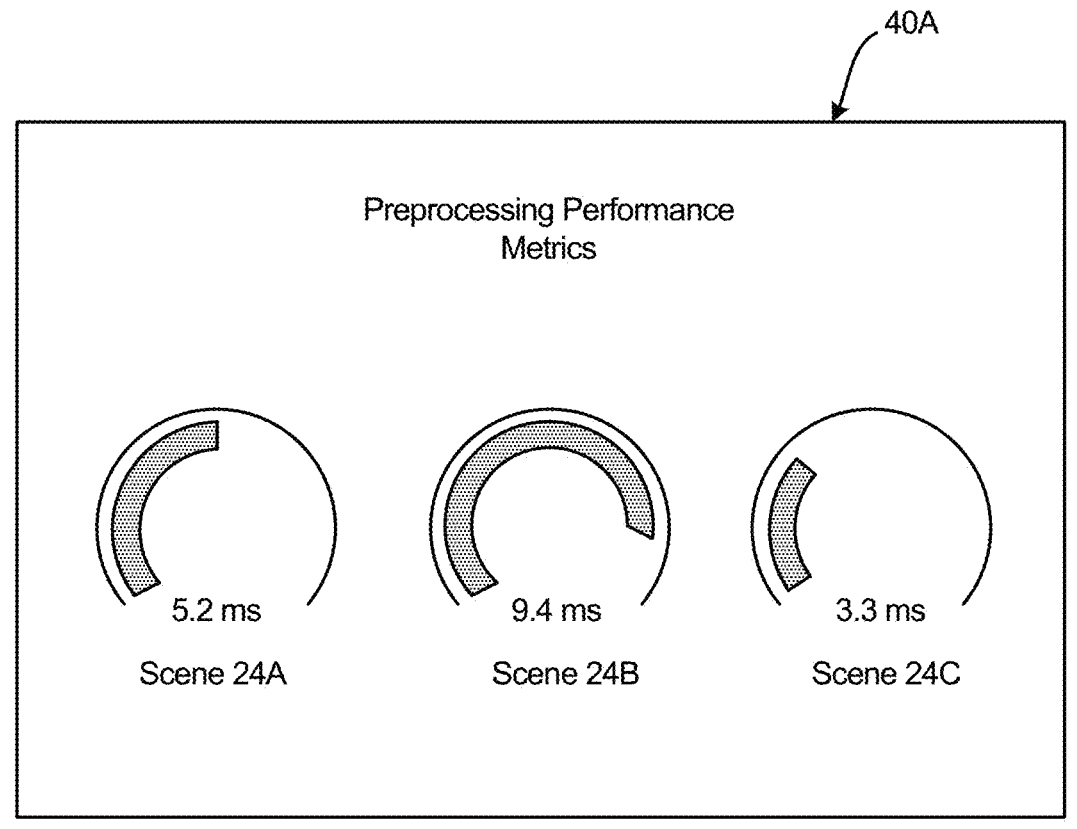
FIG. 4 is a display of an example scene preprocessing performance metrics.

During preprocessing operations to create scenes 24A-24C, the amount of time gateway 16 takes to apply all of preprocessing parameters 30A-30C to raw video data 20A to create scenes 24A-24C, respectively, (or the amount of time gateway 16 takes to apply only video edits 38A-38O of preprocessing pipeline 38, depending on the desired measurement) is measured, recorded, and published at metrics 40 for viewing by an editor or any party with access. Metrics 40 can be published using a framework like Prometheus (and then viewable/consumable by other systems, such as Grafana, with an example shown in FIG. 4). Alternatively, metrics 40 can be published on an asynchronous messaging library like ZeroMQ (similar to the publishing of scenes 24A-24C). FIG. 4 shows a display of scene preprocessing performance metrics 40A. Metrics 40 can be outputted from gateway 16 to numerous other systems and/or locations, including to the cloud or another location distant from gateway 16.

As shown in FIG. 4, scene preprocessing performance metrics 40A show a value of time for each of scenes 24A-24C. This value of time displayed is the amount of time gateway 16 takes to apply preprocessing parameters 30A-30C for each of scenes 24A-24C. Alternatively, this value of time displayed can be the amount of time gateway 16 takes to apply only video edits 38A-38O of preprocessing pipeline 38 and not the entirety of preprocessing parameters 30A-30C. This measurement may be desired because the other instructions/information of preprocessing parameters 30A-30C (other than video edits 38A-38O) may not change between scenes 24A-24C while preprocessing pipeline 38 (the video edits 38A-38O being applied) may be drastically different from scene to scene and thus the amount of time for performing preprocessing pipeline 38 may vary greatly from scene to scene.

For example, preprocessing performance metrics 40A in FIG. 4 show an amount of time gateway 16 takes to perform the video edits of preprocessing pipeline 38 for scene 24A as 5.2 milliseconds (ms), for scene 24B as 9.4 ms, and for scene 24C as 3.3 ms. In this example, it may be desirable or necessary to alter preprocessing parameters 30B in configuration file 14 (either remove some edit and/or rearrange the order in which those edits are performed by gateway 16) to reduce the amount of time gateway 16 takes to apply preprocessing pipeline 38 to create/alter scene 24B. As discussed above, gateway 16 can have the capability to optimize the order in which the edits/instructions in preprocessing parameters 30A-30C and/or preprocessing pipelines 38 are performed to reduce the amount of time needed to preprocess/apply the edits/instructions. Thus, preprocessing performance metrics 40A as shown in FIG. 4 may be the shortest amount of time gateway 16 takes to perform preprocessing parameters 30A-30C (or preprocessing pipeline 38, depending on the chosen measuring points).

Scenes 24A-24C can be published from proxy location 46 to unified endpoint 18 as topics 1-3 using an asynchronous messaging library, such as ZeroMQ. Unified endpoint 18 allows for a known, constant location to which subscribers 26A-26C can look to access scenes 24A-24C, respectively. If more scenes are created, those scenes would be published and accessible at unified endpoint 18, so subscribers 26A-26D and/or other subscribers would know where to look to access the additional scenes. Unified endpoint 18 can be located/hosted by gateway 16, as is shown in FIG. 3.

Figure 5:
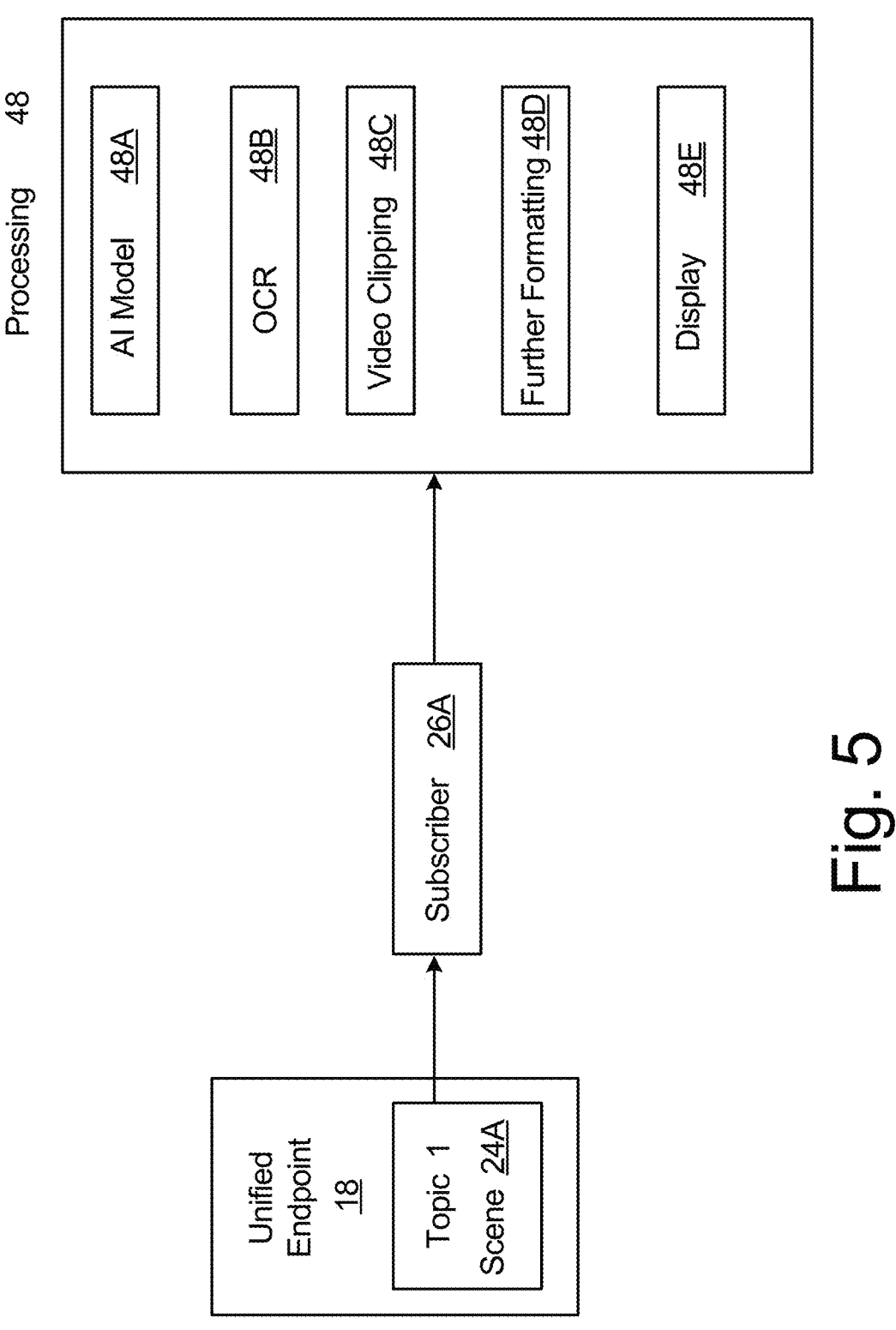
FIG. 5 is a schematic of an example potential processing by a first subscriber.

FIG. 5 is a schematic showing processing 48 capable of being performed on scene 24A by first subscriber 26A. Processing 48 can also be performed on scenes 24B and 24C or other scenes not disclosed herein.

After being published/sent to endpoint 18, scenes 24A-24C are available to be subscribed to and accessed by subscribers 26A-26D. Each scene can be subscribed to by any number of subscribers as is necessary/desirable. For example, a scene may be subscribed to by numerous subscribers each running processing 48 that includes different AI models. In this example, one AI model can be determining the amount of a first product that is passing through the scene on an assembly line, while a second AI model can be determining the amount of a second product that is passing through the scene on the same assembly line. In this case, the scene is unchanged between the two AI models (i.e., between the two subscribers) but the processing performed by each subscriber after the scene has been published is different. It should be noted that one entity (e.g., a person, company, quality control sector) can subscribe to a scene multiple times and thus be multiple subscribers. As discussed above, the preprocessing performed to create/alter each scene can be tailored to the needs of the subscriber(s) to, for example, reduce processing 48 resources and time needed to determine at least one output that is indicative of an inference the subscriber is aiming to ascertain.

The example in FIG. 5 shows first subscriber 26A performing processing 48 on scene 24A. Processing 48, as selected and executed by subscriber 26A (either automatically and/or manually by a computer processor and/or other hardware and software), can include AI model 48A, optical character recognition (OCR) 48B, video clipping 48C, further formatting 48D, and display 48E of the video data of scene 24A. Processing 48 can include other instructions/edits not expressly disclosed in FIG. 5 and listed above.

The disclosed potential instructions/edits that subscriber 26A can perform in processing 48 are as follows. AI model 48A can be a program/model that may have machine learning and can use scene 24A to determine at least one output indicative of an inference dependent upon scene 24A. The inference, for example, can be the amount of a specific product that is viewable in scene 24A over a defined period of time. AI model 48A can also be, for example, a program/model that determines how many people appear in scene 24A over a defined period of time. AI model 48A can include other capabilities and/or configurations. OCR 48B can be a program (or other configuration) that recognizes and records any characters (i.e., text) that appear in scene 24A. For example, scene 24A can be video data of a street and OCR 48B will recognize and record any text that appears on the side of a vehicle, such as a delivery truck, that is in scene 24A. Video clipping 48C can clip the video data shown in scene 24A to create a clip of a defined period of time, and/or video clipping 48C can clip the video data shown in scene 24A to create a static image of a defined moment in time. Further formatting 48D can be video edits, such as video edits 38A-38O in configuration file 14, or any other video or file formatting that are performed by subscriber 26A. For example, further formatting 48D can include cropping scene 24A to be a subset of the second field of view shown in scene 24A. Display 48E can be making scene 24A viewable on a screen or other visual display. Display 48E can also include any video formatting/reconfiguring that is necessary to effectuate the display of scene 24A. While video edits 38A-38O and further formatting 48D to create and/or process video data 21A-21C have included only edits to the video/image, edits can include editing the audio or other aspects of the video data.

The potential instructions/edits (i.e., processing 48) can be performed in parallel or series. Further, processing 48 can be configured such that instructions/edits 48A-48E work together such that one instruction/edit is prompted by an inference from another instruction/edit. For example, video clipping 48C can be configured to work in tandem with another edit/process; if AI model 48A determines that a product is defective, video clipping 48C can be prompted to record and clip a particular duration (or moment to create a static image) of scene 24A showing the defective product and save the clip (or image) for proof/validation.

System 10, with associated methods, for selection/extraction, preprocessing, and publishing of streaming video data 20 into scenes 24A-24C and for processing scenes 24A-24C is used to determine at least one output that is indicative of an inference dependent upon video data 21A-21C. System 10 reduces the preprocessing/processing time and resources necessary for accomplishing the desired output/determining the selected inference. System 10 allows for a streamlined process that extends from collecting streaming video data 20 from camera 12 to making preprocessing scenes 24A-24C available to subscribers 26A-26C for further processing and analysis/determinations. System 10 also allows for measurement, recordation, and viewing of preprocessing performance metrics 40 and optimization of preprocessing pipeline 38 (and/or preprocessing parameters 30A-30C) to reduce the amount of time and resources needed to apply preprocessing parameters 30A-30C to streaming video data 20 (i.e., raw video data 20A) to create video data 21A-21C of scenes 24A-24C.

System 10 and associated methods can include other components, capabilities, and/or functionalities and/or be used along with, for example, large language models (hereinafter referred to as "LLMs") to further process video data 21A-21C and/or to determine alternations/edits to the preprocessing parameters within configuration file 14 that are then applied to streaming video data 20 for preprocessing into video data 21A-21C having scenes 24A-24C. System 10 and associated methods that use one or multiple LLMs can include and/or function in conjunction with other components, systems, etc. as are described in FIG. 6. The capabilities and/or functions as described with regards to FIG. 6 can be used by and/or with any components disclosed herein.

Figure 6:
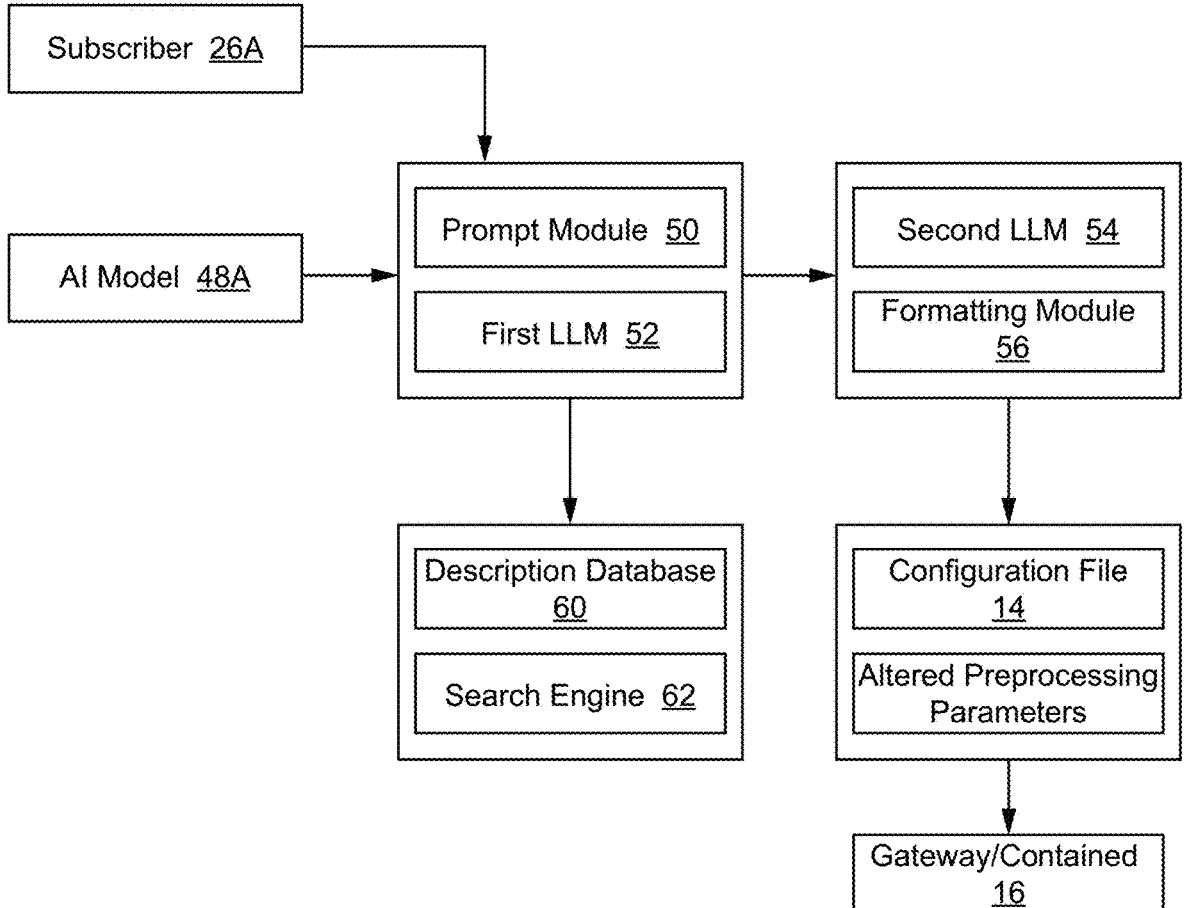
FIG. 6 is a schematic of the example system having additional processing and/or review capabilities by various components associated with at least one large language model.

FIG. 6 is a schematic of an example system 10 having additional processing and/or review capabilities by various components associated with at least one LLM. System 10 can include and/or function in conjunction with prompt module 50, first LLM 52, second LLM 54, formatting module 56, description database 60, and/or search engine 62. The configuration set out in FIG. 6 can interact with, receive information from, and/or provide information to components/elements shown and described with regards to other figures, such as subscriber 26A, AI model 48A, configuration file 14, and/or gateway/container 16. Further, while not shown and/or described herein, the configuration set out in FIG. 6 can also receive and/or access streaming video data 20 from camera 12 and/or from other components/locations. First LLM 52 and/or second LLM 54 as described herein can more broadly be transformer models and/or any other systems/models configured to have the capabilities contributed to LLMS 52 and/or 54 as described below.

As described with regards to FIG. 6, system 10 can include alternate and/or further processing of video data 21A-21C (corresponding to scenes 24A-24C). One, multiple, or all of video data 21A-21C can be provided to and/or otherwise accessed by, for example, any of the components described in FIG. 6, such as prompt module 50 and/or first LLM 52, by subscribing to unified endpoint 18 via subscriber 26A and/or as provided by AI model 48A along with, for example, one or multiple outputs indicative of one or multiple inferences dependent upon video data 21A-21C/scenes 24A-24C. This communication can occur via any method, including wired and/or wireless communication, such as the internet. The example below is described with regards to first video data 21A of scene 24A (with first video data 21A being comprised of one or multiple still images/frames that collectively form video data). However, the disclosed components and/or methods can be used with any video data of any scenes/regions of interest. Along with video data 21A/scene 24A, prompt module 50 and/or first LLM 52 can receive instructions requesting first LLM 52 to describe video data 21A.

Prompt module 50 can be configured to prompt/request first LLM 52 (and, potentially, second LLM 54) to perform various specified tasks. Prompt module 50 can include and/or function in conjunction with any components of system 10 and/or can be configured to be a separate component/system distinct from system 10. Prompt module 50 can generate a request to first LLM 52 asking first LLM 52 to review video data 21A (e.g., one or multiple frames of video data 21A having scene 24A) and describe the occurrences/imagery of video data 21A. The prompt can include asking first LLM 52 to review one, multiple, or all individual frames that form video data 21A and described each, multiple, or all of the frames individually, in groups, and/or collectively. In one example, each frame in the series of frames that form video data 21A is provided to first LLM 52 and prompted, by prompt module 50, to describe what is happening in each frame/image. The series of frames forming video data 21A can be continuously provided to prompt module 50 and/or first LLM 52 as a continuous stream of video data 21A (similar to streaming video data 20 being provided to and/or otherwise accessed by gateway/container 16 in FIG. 1).

The prompt to first LLM 52 as generated, compiled, and/or otherwise used by prompt module 50 can include other information, such as example descriptions that provide guidance as to content, layout, etc. of the description(s) first LLM 52 is to generate/determine. The prompt to first LLM

52 as generated, compiled, etc. by prompt module 50 can include other information, request first LLM 52 to perform other determinations, and/or request first LLM 52 to make those determinations in a variety of different ways/processes as described below. The request to first LLM 52 by first prompt module 50 can be a simple request/prompt that can include only one question/query/inquiry or can be a complex/compound request/prompt that can include/request a series of separate steps/tasks performed sequentially, concurrently, and/or in another fashion to return desired results. The prompt by prompt module 50 can also include one or multiple outputs as generated by AI module 48A. The prompt can be at least partially dependent upon the output(s) generated by AI module 48A and/or request that first LLM 52 expand on (e.g., add to) those outputs. In one example, AI module 48A determines an output that includes whether the specific frame of video data 21A shows a hammer and, if so, how many. Prompt module 50 can generate a prompt to first LLM 52 that requests first LLM 52 to describe where in the frame the hammer(s) are located, the color of the hammer(s), whether there are people in the frame, whether the hammer(s) are in a hand of a person, what the person is doing with the hammer(s), etc. Additionally, prompt module 50 can generate and/or include, in an already formulated prompt, a request asking first LLM 52 to describe the time of day of scene 24A in video data 21A, the point of view, the contrast, the blur, etc. of the frame(s). Prompt module 50 can be configured to generate and/or include any information, requests, etc. in the one and/or multiple prompts to first LLM 52. In one example, each prompt to first LLM 52 is newly generated by prompt module 50 while in another example, a portion and/or all of a prior prompt is reused to generate a subsequent prompt to first LLM 52.

Prompt module 50 can be configured to generate, compile, etc. one and/or multiple prompts for first LLM 52 manually as initiated and/or generated by a user/subscriber, and/or prompt module 50 can be configured to automatically generate/compile one or multiple prompts for first LLM 52 in response to, for example, the reception of and/or access to video data 21A. Additionally and/or alternatively, prompt module 50 can be configured to automatically generate prompt(s) in response to any other triggering events/instructions. The generation of one or multiple prompts 50 can be periodic and/or continuous as initiated by, for example, the reception/access to one or multiple frames of video data 21A/scene 24A. The prompts as generated by prompt module 50 can be saved at any location and/or immediately and/or quickly be provided/sent to first LLM 52 for execution by first LLM 52. Prompt module 50 can generate prompts for second LLM 54 in a similar fashion as that described above with regards to first LLM 52, and prompt module 50 can use other methods and/or have other capabilities not expressly disclosed herein. With regards to second LLM 54, prompt module 50 can generate different prompts requesting different tasks from second LLM 54 as compared to the prompts with regards to first LLM 52. Additionally, system 10 can have another configuration in which a second prompt module generates/compiles the prompts for second LLM 54.

System 10 can include and/or work in conjunction with, receive information from, and/or provide information to first LLM 52 and/or to second LLM 54. In one configuration, first LLM 52 and second LLM 54 are a separate and distinct component/system from system 10, and LLMs 52 and/or 54 access and/or otherwise receive information from system 10 (such as one, multiple, or all frames of video data 21A along with corresponding prompt(s)) and/or from each other (such as second LLM 54 receiving description(s) from first LLM 52) via the internet. While the example in FIG. 6 shows first LLM 52 and second LLM 54 as being separate and distinct components/systems from one another, first LLM 52 and second LLM 54 can be the same large language model. Additionally, while the example in FIG. 6 shows first LLM 52 and second LLM 54 as being components within (e.g., part of) system 10, first LLM 52 and/or second LLM 54 can be separate and distinct from system 10 (i.e., at a location distant from system 10) and communicate with system 10 via wired or wireless communication.

LLMs 52 and 54 and similar models are deep learning algorithms that can recognize, summarize, describe, translate, predict, and/or generate content using large datasets, which can include information available and/or accessed on the internet. While an LLM is described herein as being model configured to perform natural language processing, LLM as used in this disclosure can be a model, system, module, component, etc. that has boarder capabilities than just natural language processing. For example, the LLMs as described herein can be transformer models that include one or more language models, neural networks, recurrent neural networks, convolution neural networks, machine learning, artificial intelligence, and/or other capabilities. In one example, LLMs 52 and/or 54 are transformer models that include at least one large language model. In another example, LLMs 52 and/or 54 are transformer models that include at least one large language model along with other models and/or components, such as a model/system configured to process/recognize images and/or video as described herein. Thus, LLM 52 and/or 54 can receive the prompt, use natural language processing to determine the action(s) dependent upon the prompt, and process/recognize frames/images and/or video data.

LLMs 52 and 54, which can be transformer models and/or other systems/models, can be used to process simple or complex requests which, for example, demand retrieval of data from multiple or specialized sources, assemble outputs (e.g., natural language, computer code, lists) from the retrieved data based on identified criteria, and/or further process of those outputs (e.g., transmission or archival to specified categories or locations and/or recipients). LLMs 52 and 54 can include generalized LLMs, specialized LLMs, and/or other models. LLMs 52 and 54 can be models and/or other systems known to one of skill in the industry for retrieving, organizing, summarizing, manipulating, and/or performing other functions with regards to information in response to one or multiple requests from, for example, prompt module 50. LLMs 52 and 54 can be configured to communicate with (e.g., provide information to and receive information from) any of the components of system 10 and/or other components, such as each other, prompt module 50, formatting module 56, description database 60, search engine 62, configuration file 14, gateway/container 16, and/or any other components.

In response to one or multiple prompts from prompt module 50 (and the reception of and/or access to information, such as video data 21A and/or outputs from AI module 48A), first LLM 52 can be configured to describe one or all frames of video data 21A, specified frames of video data 21A, video data 21A as a whole (e.g., a chunk of video data 21A and/or a continuous description of the continuous stream of video data 21A), and/or other portions of video data 21A. The description as generated by first LLM 52 can include any information as prompted/requested and/or other information regarding the characteristics, setting, events, etc. shown in video data 21A. The description can be as short/concise as a few words or as long/verbose as a number of paragraphs and can have any format, such as paragraphs with complete sentences, a list, and/or other formats/organizations. First LLM 52 can generate a description for each frame of video data 21A provided to first LLM 52. In another example, frames of video data 21A are continuously provided to first LLM 52 (in order), and first LLM 52 describes each frame and adds that description of that specific frame to the end of the previous description so as to generate a running, continuous description of the frames of video data 21A. In another example, first LLM 52 is configured to compare the currently analyzed frame (e.g., the frame that is about to be and/or is currently being described by first LLM 52) to the preceding frame. In response to the frame being the same as the preceding frame, first LLM 52 can be instructed not to describe the current frame. In response to the frame being different from the preceding frame, first LLM 52 can be instructed to describe the differences in the currently analyzed frame as compared to the preceding frame. This configuration/process can be repeated for subsequent frames and/or analysis as the frames of video data 21A are analyzed by first LLM 52. This configuration/process may be advantageous as it does not require first LLM 52 to repeat descriptive language for parts of the frame that have already been described and instead first LLM 52 can focus only on the differences in the frames. Such a configuration/process may also be advantageous to the user reviewing the descriptions as the descriptions may be more easily readable and understandable.

The descriptions, during and/or after being generated by first LLM 52, can be communicated to a variety of locations, components, and/or systems. In one example, one, multiple, or all descriptions are communicated to (i.e., provided to and/or accessed by) storage media associated with system 10. In another example, one, multiple, or all descriptions are communicated to description database 60, which can be a component of system 10, located within storage media, and/or at another location separate from system 10. Description database 60 can be configured to organize descriptions, alter/convert each description into a different format, etc. as described below. In a third example, one, multiple, or all descriptions can be communicated to a second LLM 54 that can review/analyze the descriptions and determine further inferences as described below. In other examples, the descriptions can be provided to other locations, such as to a user at a location within and/or distant from system 10. Additionally and/or alternatively, the descriptions can be provided to/accessed by one, multiple, or all of these components/locations. For example, the descriptions can be provided to/accessed by description database 60 and also by/to second LLM 54. The descriptions can be communicated/provided in real time as each description is generated. In another example, the descriptions can be provided after all descriptions are generated and assembled/compiled into one document, file, etc.

Description database 60 can include and/or work in conjunction with any of the components of system 10 and/or other components. In one example, description database 60 includes storage media and/or performs instructions by and/or with assistance from a computer processor. One, multiple, or all of the descriptions as generated by first LLM 52 and corresponding to frame(s) and/or the entirety of video data 21A of scene 24A can be saved/stored in description database 60. Additionally, each of the descriptions can be saved/stored along with the corresponding frame. In another example, the descriptions are saved/stored along with output(s) as generated by AI module 48A.

The descriptions can be saved/stored in natural language as generated by first LLM 52 or in another format. For example, description database 60 and/or search engine 62 can convert the descriptions and/or the corresponding frames accompanying the descriptions into one or multiple vector embeddings, which can be representative of the content of the description(s) and/or frame(s). Each of those vector embedding can be, for example, saved in descriptions database 60. The descriptions and/or frames being vector embeddings can allow for the descriptions and/or frames to be searched via search engine 62 (and/or another component/system) without the need for keyword searching and/or other searching that focuses on the text of the description. Description database 60 can be configured to convert the descriptions and/or frames into vector embeddings, and the conversion can be performed at any point in time, such as after each description and/or associated frame is received/accessed by description database 60, after there is a request to search the descriptions and/or frames by, for example, search engine 62, and/or at another time.

A user, program, and/or another system can search the descriptions and/or associated frames (and/or the entirety of video data 21C) via, for example, search engine 62. System 10 can work in conjunction with, receive information from, and/or provide information to search engine 62. In another example, search engine 62 is a separate system/component from system 10. Search engine 62, as described above, can convert the descriptions and/or associated frames (and/or other information associated with video data 21A) into one or multiple vector embeddings. Search engine 62 can be any software system(s) that identifies results/information in databases/datasets (such as description database 60) in response to one or multiple queries/requests. Search engine 62 can be configured to perform any type of search, such as a similarity search, to determine relevant description(s) and/or associated frame(s) of video data 21A. For example, a similarity search can be a vector search based on threshold vector similarly (e.g., cosine similarity, between vectorized queries and description). The databases/datasets (e.g., description database 60) can be, for example, available and/or accessed on the internet. Search engine 62 can be configured to provide search results (e.g., data, information) as prompted by any type of query, such as a navigational, informational, transaction, and/or investigational query. Additionally, the query can be in the form of a semantic and/or similarity search. Search engine 62 can be any system, model, and/or process known to one of skill in the industry for providing results/information in response to one or multiple queries/requests. Search engine 62 can be configured to communicate with (e.g., provide information to and receive information from) any components of system 10, including prompt module 50, first LLM 52, second LLM 54, formatting module 56, configuration file 14, gateway/container 16, and/or other components of system 10 and/or distinct from system 10.

In another configuration, search engine 62 can include receiving, accessing, generating, formulating, and/or otherwise using a search inquiry to search/find relevant description(s) and/or associated frame(s). In one example, the search inquiry is in natural language and search engine 62 searches description database 60 in natural language (with the descriptions and associated frames being saved/stored in description database 60 using natural language as generated by first LLM 52). In another example, search engine 62 (or another system/component) can convert the search inquiry into a vector embedding representative of the search inquiry. Then, the search inquiry vector embedding can be compared to all vector embeddings representative of/corresponding to the descriptions and/or associated frames in the description database 60 (with the descriptions and/or associated frames being save/stored as vector embedding(s)). The comparison can reveal the one or multiple descriptions and/or associated frames that are most similar to the search inquiry, which is determined by the vector embeddings of the descriptions and/or associated frames that are the most similar to the search inquiry vector embedding. These similar description(s) and/or associated frames can be produced/ outputted by search engine 62 as a result representative of at least one description (and/or at least one frame) that corresponds to the at least one vector embedding that is the most similar to the search inquiry vector embedding.

For example, a user can be interested in the one and/or multiple frames of video data 21A of scene 24A that include a person wearing a white shirt. The user can form a search inquiry via search engine 62 to search description database 60 for a person wearing a white shirt. If the search is to be performed using natural language, the search inquiry can include language that at least says something similar to "a person with a white shirt." If the search is to be performed using vector embeddings (e.g., a similarity search), the search inquiry can be converted to a vector embedding. Then, search engine 62 can search description database 60 by comparing the search inquiry (e.g., the natural language and/or the search inquiry vector embedding) to the descriptions and/or associated frames (and/or the vector embeddings of the descriptions and/or associated frames). Search engine 62 can produce results that include at least one description and/or associated frames that most closely match (e.g., are most similar to) the search inquiry. In this example, the results could include multiple frames that include an individual with a light-colored jacket present in fifty-eight descriptions and/or associated frames. The results could also include the times of day/dates corresponding to those frames. The results can then be provided/communicated to the user via any method.

The use of first LLM 52, description database 60, and/or search engine 62 can have other configurations, capabilities, and/or functionalities not described herein to allow users, systems, etc. to review, analyze, and/or otherwise use video data 21A of scene 24A without the need to personally watch every frame of video data 21A (which can be quite extensive and/or time consuming). Additionally, the above disclosed process with regards to prompt module 50, first LLM 52, description database 60, and/or search engine 62 allows for searching of video data 21A via text as opposed to searching video data 21A via other methods/processes that may use image analyses.

An additional and/or alternate process can include communicating to and/or otherwise using the descriptions and/or associated frames by second LLM 54. Second LLM 54 can be configured to review the at least one description and determine altered preprocessing parameters in, for example, an altered and/or new configuration file 14 with the altered preprocessing parameters altering video data 21C of scene 24C (which is from streaming video data 20) as preprocessed by gateway/container 16. Second LLM 54 can have the same or similar configurations, capabilities, functionalities, etc. as first LLM 52 as described above, including a configuration in which first LLM 52 and second LLM 54 are the same large language model. Additionally, second LLM 54 can function in conjunction with prompt module 50 and/or other systems/components to receive prompts/requests and perform instructions and produce/generate results. The prompt/request for second LLM 54 can ask second LLM 54 to review the provided description(s) as generated by first LLM 52 and/or associated frames and: 2) determine whether any preprocessing parameters need to be altered; 2) determine how those preprocessing parameters should be altered to improve video data 21C; 3) determine the altered preprocessing parameters; and/or 4) determine a proper format for those altered preprocessing parameters so as to allow for use by gateway/container 16 for preprocessing of video data 21A. Along with the prompt/request, second LLM 54 can be provided with and/or have access to the descriptions and/or the associated frames. The prompt can also include, for example, an example configuration file 14 and/or an example format for the preprocessing parameters to aid second LLM 54 in formatting the altered preprocessing parameters. Thus, second LLM 54 can format the altered preprocessing parameters so as to be accepted and applied by gateway/container 16. In another example, formatting module 56 formats the altered preprocessing parameters, as determined by second LLM 54, into a format that is acceptable and appliable by gateway/container 16. As with first LLM 52, the prompt/request to second LLM 54 can be in any format, can be simply and/or complex, and/or can have other configurations and/or information. For example, the prompt can be one prompt that requests the determination for each description/frame of multiple provided descriptions/frames, and/or the prompt can include multiple prompts, which can be one for each description/ frame and/or can correspond to multiple requests.

In response to one or multiple prompts/requests, which can be generated by prompt module 50 and/or another component/system, second LLM 54 can determine whether the preprocessing parameters that were used to preprocess the video data 21A (upon which the descriptions generated by first LLM 52 depend) should be altered to improve the quality (and/or other characteristics) of video data 21A. For example, the description corresponding to one or multiple frames of video data 21A can state that scene 24A is at dusk and a person in view is too blurry to be able to tell if the person is a male or female. From this description, second LLM 54 can determine that the brightness preprocessing parameter (e.g., video edit) needs to be altered (because it is dusk in scene 24A) and that the blur and possible crop preprocessing parameters need to be altered to clarify the image/frame and possibly zoom in on the person to identify if the person is a male or female. In other examples, second LLM 54 can determine whether other preprocessing parameters should be altered to improve the quality and/or to produce other specific results. Additionally and/or alternatively, second LLM 54 can determine to what extent the preprocessing parameters should be altered. For example, if the brightness preprocessing parameter needs to be altered, second LLM 54 can determine that the brightness preprocessing parameter should be altered from a value of 32 to a value of 78. Such a determination can be performed by second LLM 54 for any of the preprocessing parameters, such as crop, grayscale, contrast, brightness, color threshold, resize, blur, hue saturation value, sharpen, erosion, dilation, Laplacian image processing, Sobel image processing, pyramid up, and pyramid down.

The prompting, review/analysis, and/or determination by second LLM 54 can be performed manually as instructed/ prompted and/or can be performed automatically, for example, each time a description is generated by first LLM 52 and/or accessed/received by second LLM 54. In another example, the prompting and/or determination can be performed automatically by second LLM 54 in response to any instructions/triggering events.

The results/inferences of the determination(s) by second LLM 54, which can include whether any preprocessing parameters need to be altered and to what extend those preprocessing parameters should be altered, can be saved/ stored at any location and/or communicated to a variety of locations, components, and/or systems. In one example, one, multiple, or all results are communicated to (i.e., provided to and/or accessed by) storage media associated with system 10. In another example, one, multiple, or all results are communicated to formatting module 56, which can be a component of system 10 and/or at another location separate from system 10. In another example, the altered preprocessing parameters are provided to configuration file 14 to replace the existing preprocessing parameters and/or the altered preprocessing parameters are set in a new configuration file that is used by gateway/container 16 to preprocess streaming video data 20 to create altered video data 21A. In other examples, the results/inferences can be provided to other locations, such as to a user at a location within or distant from system 10. Additionally and/or alternatively, the descriptions can be provided to/accessed by one, multiple, or all of these components/locations. The results (e.g., the determinations of whether the preprocessing parameters need to be altered and to what extend they need to be altered) can be communicated in real time as each determination is generated. In another example, the determinations can be communicated after a specified amount of time has passed and/or corresponding to a particular chunk of descriptions/ frames/video data 21A.

Formatting module 56 can include and/or work in conjunction with any of the components of system 10 and/or other components/systems distinct from system 10. Formatting module 56 can be configured to format the determinations as to the altered preprocessing parameters as determined by second LLM 54 into a format that is acceptable and appliable by gateway/container 16. This format can be a template to which formatting module 56 inserts the preprocessing parameters determined by second LLM 54, and/ or this format can include a portion of and/or the entirety of a new configuration file 14. Further, formatting module 56 can add to, modify, and/or delete any information provided by second LLM 54 to put the altered preprocessing parameters in an acceptable format. Formatting module 56 can also include communication capabilities to receive determinations/information from second LLM 54 and/or to provide the properly formatted altered preprocessing parameters to configuration file 14 and/or to gateway/container 16. In another example, formatting module 56 provides access to the altered preprocessing parameters to configuration file 14, to gateway/container 16, and/or to other systems/components. The system(s) described in FIG. 6 can include a configuration in which formatting module 56 is not needed and rather second LLM 54 formats the altered preprocessing parameters into an acceptable format. Formatting module 56 can have other configurations, capabilities, and/or functionalities not described herein.

The use of second LLM 54 and/or formatting module 56 can have other configurations, capabilities, and/or functionalities not described herein to determine altered preprocessing parameters by which gateway/container 16 should preprocess streaming video data 20 to generate altered video data 21A without the need for a user to review video data 21A and make decisions as to the preprocessing of video data 21A. Additionally, the above described process with regards to second LLM 54 and/or formatting module 56 allows for preprocessing parameter determinations via text as opposed to reviewing/analyzing video data 21A via other methods/processes that may use image analyses.

The following are nonlimiting examples of system 10 and/or process 100:

A process of preprocessing incoming video data having at least one region of interest can include receiving the incoming video and preprocessing the incoming video data, by a computer processor, according to preprocessing parameters, wherein the preprocessing includes formatting the incoming video data to create first video data of a first region of interest. The process can further include accessing the first video data by an AI model, processing the first video data by the AI model to determine an output that is indicative of a first inference dependent upon the first video data, providing the first video data and the output to an LLM along with a prompt requesting the LLM to describe the first video data, and describing, by the LLM, the first video data to create at least one description of the first video data.

The process can further include generating at least one vector embedding from the at least one description of the first video data.

The process can further include that step of describing the first video data by the LLM includes describing a first frame of the first video data to create a first description and generating a first vector embedding from the first description.

The process can further include generating additional descriptions embeddings from additional frames of the first video data and converting the additional descriptions to additional vector embeddings corresponding to each additional frame.

The process can further include searching all of the descriptions corresponding to the frames of the first video data to find at least one relevant frame of the first video data.

The process can further include converting a search inquiry into an inquiry vector embedding, comparing the inquiry vector embedding to all vector embeddings corresponding to all generated descriptions, and producing a result of the search that includes at least one description that corresponds to at least one vector embedding that is the most similar to the inquiry vector embedding.

The process can further include providing in the result at least one frame corresponding to the at least one description in the results.

The process can further include continuously providing frames of the first video data to the LLM.

The process can further include describing a first frame by the LLM to create a first description and comparing the first frame to a second frame that immediately follows the first frame in the first video data. The process can also include, in response to the second frame being different from the first frame, describing the second frame by the LLM to create a second description and, in response to the second frame being the same as the first frame, not describing the second frame.

The process can further include, in response to the second frame being the same as the first frame, comparing the second frame to a third frame that immediately follows the second frame in the first video data and, in response to the third frame being different from the second frame, describing the third frame by the LLM to create a third description.

A process of preprocessing incoming video data of at least one region of interest can include receiving the incoming video and preprocessing the incoming video data, by a computer processor, according to preprocessing parameters, wherein the preprocessing includes formatting the incoming video data to create first video data of a first region of interest. The process can also include providing the first video data to an LLM along with a prompt requesting the LLM to describe the first video data and describing, by the LLM, the first video data to create at least one description of the first video data.

The process can further include that the first video data includes multiple frames that collectively form the first video data, and wherein the step of describing the first video data to create at least one description of the first video data further includes describing, by the LLM, a first frame of the multiple frames of the first video data to create a first description and describing, by the LLM, a second frame of the multiple frames of the first video data to create a second description, the second frame being after the first frame in the first video data.

The process can further include that at least one frame of the multiple frames of the first video data is between the first frame and the second frame and the at least one frame between the first frame and the second frame is not described by the LLM.

The process can further include that the at least one frame between the first frame and the second frame is not provided to the LLM.

The process can further include that the second frame is at least ten frames after the first frame in the first video data such that the LLM does not describe all frames of the multiple frames of the first video data.

The process can include providing the first video data to an AI model and processing the first video data by the AI model to determine an output that is indicative of a first inference dependent upon the first video data, wherein the output is provided to the LLM along with the first video data.

The process can further include that the first video data includes a series of frames that collectively form the first video data, and wherein the step of describing the first video data to create at least one description of the first video data further includes describing a first frame in the series of frames to create a first description, comparing the first frame to a second frame that is after the first frame in the series of frames, and, in response to the second frame being different from the first frame, describing the difference in the second frame as compared to the first frame to create a second description.

The process can further include, in response to the second frame being the same as the first frame, determining, by the LLM, not to describe the second frame and not to create a second description.

The process can further include continuing to compare each frame of the series of frames to a subsequent frame and, in response to the subsequent frame being different, describing the difference in the subsequent frame to create at least one description.

The process can further include compiling multiple descriptions of the at least one description of the first video data.

A process of preprocessing incoming video data having at least one region of interest can include receiving the incoming video and preprocessing the incoming video data, by a computer processor, according to preprocessing parameters, wherein the preprocessing includes formatting the incoming video data to create first video data of a first region of interest The process can further include accessing the first video data by a first LLM, providing the first video data and the output to the first LLM along with a prompt requesting the first LLM to describe the first video data, and describing the first video data by the first LLM to generate at least one description of the first video data.

The process can further include providing the at least one description to a second LLM with a prompt requesting the second LLM to review the at least one description and determine altered preprocessing parameters that alter the first video data and reviewing the at least one description, by the second LLM, and determining altered preprocessing parameters dependent upon the at least one description. The process can also include providing the altered preprocessing parameters to the computer processor and preprocessing the incoming video data according to the altered preprocessing parameters to create altered first video data of the first region of interest.

The process can further include that the altered preprocessing parameters change at least one of the following video edits of the incoming video data as compared to the unaltered preprocessing parameters: crop, grayscale, contrast, brightness, color threshold, resize, blur, hue saturation value, sharpen, erosion, dilation, Laplacian image processing, Sobel image processing, pyramid up, and pyramid down.

The process can further include formatting, by the second LLM, the altered preprocessing parameters so as to be accepted and applied by the computer processor.

The process can further include providing the altered preprocessing parameters to a formatting module and formatting the altered preprocessing parameters, by the formatting module, into a format that is acceptable by the computer processor, wherein the formatting module provides the altered preprocessing parameters in an acceptable format to the computer processor.

The process can further include that the first LLM/transformer and the second LLM/transformer are the same LLM/transformer.

The process can further include that the first LLM is different from the second LLM.

The process can further include publishing the first video data to an endpoint, wherein accessing the first video data includes subscribing to the endpoint.

The process can further include that the endpoint is hosted by a gateway.

The process can further include that the incoming video data is received from a camera.

A process of preprocessing incoming video data having at least one region of interest can include accessing the incoming video data and preprocessing the incoming video data, by a computer processor, according to preprocessing parameters, wherein the preprocessing includes formatting the incoming video data to create first video data of a first region of interest. The process can further include accessing the first video data by an AI model, processing the first video data by the AI model to determine a first output that is indicative of a first inference dependent upon the first video data, and providing the first video data, the first output, and a first prompt to a first LLM with the first prompt requesting the first LLM to describe the first video data. The process can also include describing, by the first LLM, the first video data to create at least one description of the first video data; providing the at least one description and a second prompt to a second LLM with the second prompt requesting the second LLM to determine altered preprocessing parameters that alter the incoming video data to create second video data; and determining, by the second LLM, the altered preprocessing parameters dependent upon the at least one description with the altered preprocessing parameters altering the incoming video data to create the second video data.

The process can further include providing the altered preprocessing parameters to the computer processor and preprocessing the incoming video data according to the altered preprocessing parameters to create the second video data.

The process can further include providing the second video data and a third prompt to the first LLM with the third prompt requesting the first LLM to describe the second video data and describing, by the first LLM, the second video data to create at least one description of the second video data.

The process can further include compiling the at least one description of the first video data and the at least one description of the second video data into an overall video data description.

The process can further include providing the altered preprocessing parameters to a formatting module; formatting the altered preprocessing parameters, by the formatting module, into a format that is acceptable by the computer processor; and providing the altered preprocessing parameters in an acceptable format to the computer processor.

The process can further include that the first LLM and the second LLM are the same LLM.

The process can further include that the altered preprocessing parameters change at least one of the following video edits of the incoming video data as compared to the preprocessing parameters used to create the first video data: crop, grayscale, contrast, brightness, color threshold, resize, blur, hue saturation value, sharpen, erosion, dilation, Laplacian image processing, Sobel image processing, pyramid up, and pyramid down.

The process can further include generating multiple vector embeddings corresponding to multiple descriptions of the at least one description of the first video data.

The process can further include that the at least one description of the first video data include multiple descriptions with each description being generated by the first LLM and corresponding to one frame of multiple frames that form the first video data.

The process can further include searching the multiple descriptions to find at least one relevant frame of the first video data.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A method of preprocessing incoming video data having at least one region of interest, the method comprising:
 receiving the incoming video;
 preprocessing the incoming video data, by a computer processor, according to preprocessing parameters, wherein the preprocessing includes formatting the incoming video data to create first video data of a first region of interest;
 providing the first video data to a transformer model along with a prompt requesting the transformer model to describe the first video data;
 describing, by the transformer model, the first video data to create at least one description of the first video data;

generating altered preprocessing parameters based upon the at least one description of the first video data; and
 preprocessing the incoming video data according to the altered preprocessing parameters.

2. The method of claim 1, wherein the transformer model includes a large language model.

3. The method of claim 1, wherein the step of describing the first video data by the transformer model includes describing a first frame of multiple frames that form the first video data to create a first description, and the method further includes:
 generating a first vector embedding from the first description.

4. The method of claim 3, further comprising:
 generating additional descriptions embeddings from additional frames of the multiple frames that form the first video data; and
 converting the additional descriptions to additional vector embeddings corresponding to each additional frame.

5. The method of claim 4, further comprising:
 searching all of the descriptions corresponding to the multiple frames that form the first video data to find at least one relevant frame of the multiple frames that form the first video data.

6. The method of claim 5, further comprising:
 converting a search inquiry into an inquiry vector embedding;
 comparing the inquiry vector embedding to all vector embeddings corresponding to all generated descriptions; and
 producing a result of the search that includes at least one description that corresponds to at least one vector embedding that is the most similar to the inquiry vector embedding.

7. The method of claim 6, further comprising:
 providing in the result at least one frame corresponding to the at least one description in the result.

8. The method of claim 1, further comprising:
 continuously providing frames of the multiple frames that form the first video data to the transformer model.

9. The method of claim 1, further comprising:
 describing a first frame by the transformer model to create a first description;
 comparing the first frame to a second frame that follows the first frame in the first video data;
 in response to the second frame being different from the first frame, describing the second frame by the transformer model to create a second description; and
 in response to the second frame being the same as the first frame, not describing the second frame.

10. The method of claim 9, further comprising:
 in response to the second frame being the same as the first frame, comparing the second frame to a third frame that follows the second frame in the first video data; and
 in response to the third frame being different from the second frame, describing the third frame by the transformer model to create a third description.

11. The method of claim 1, further comprising:
 accessing the first video data by an AI model; and
 processing the first video data by the AI model to determine an output that is indicative of a first inference dependent upon the first video data,
 wherein the output is provided to the transformer model along with the first video data and the prompt requesting the transformer model to describe the first video data.

12. A method of preprocessing incoming video data of at least one region of interest, the method comprising:

receiving the incoming video;

preprocessing the incoming video data, by a computer processor, according to preprocessing parameters, wherein the preprocessing includes formatting the incoming video data to create first video data of a first region of interest, wherein the first video data includes multiple frames that collectively form the first video data;

providing the first video data to a transformer model along with a prompt requesting the transformer model to describe the first video data;

describing, by the transformer model, a first frame of the multiple frames of the first video data to create a first description;

describing, by the transformer model, a second frame of the multiple frames of the first video data to create a second description with the second frame being after the first frame in the first video data;

generating altered preprocessing parameters based upon the at least one of the first description and the second description; and preprocessing the incoming video data according to the altered preprocessing parameters.

13. The method of claim 12, wherein at least one frame of the multiple frames of the first video data is between the first frame and the second frame and the at least one frame between the first frame and the second frame is not described by the transformer model.

14. The method of claim 13, wherein the at least one frame between the first frame and the second frame is not provided to the transformer model.

15. The method of claim 13, wherein the second frame is at least ten frames after the first frame in the first video data such that the transformer model does not describe all frames of the multiple frames of the first video data.

16. The method of claim 12, further comprising:

providing the first video data to an AI model; and processing the first video data by the AI model to determine an output that is indicative of a first inference dependent upon the first video data, wherein the output is provided to the transformer model along with the first video data.

17. The method of claim 12, further comprising:

comparing the first frame to a second; and in response to the second frame being different from the first frame, describing the difference in the second frame as compared to the first frame to create the second description.

18. The method of claim 17, further comprising:

in response to the second frame being the same as the first frame, selecting, by the transformer model, a new second frame to describe to create the second description.

19. The method of claim 18, further comprising:

continuing to compare each frame of the multiple frames to a subsequent frame and, in response to the subsequent frame being different, describing the difference in the subsequent frame to create at least one new description.

20. The method of claim 11, wherein the transformer model includes a large language model.

* * * * *